(12) United States Patent
Kim et al.

(10) Patent No.: US 8,417,232 B2
(45) Date of Patent: Apr. 9, 2013

(54) APPLICATION COMPONENT OPERATING METHOD FOR SDR TERMINAL AND SDR TERMINAL

(75) Inventors: Junsik Kim, Sungnam-si (KR); Namhoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/742,796

(22) PCT Filed: Dec. 17, 2008

(86) PCT No.: PCT/KR2008/007460
§ 371 (c)(1),
(2), (4) Date: May 13, 2010

(87) PCT Pub. No.: WO2009/078660
PCT Pub. Date: Jun. 25, 2009

(65) Prior Publication Data
US 2011/0107319 A1     May 5, 2011

(30) Foreign Application Priority Data

Dec. 17, 2007  (KR) .................. 10-2007-0131973

(51) Int. Cl.
*H04M 3/00*     (2006.01)
*H04M 1/00*     (2006.01)
*H04W 36/00*    (2009.01)
*G06F 9/44*     (2006.01)
*G06F 9/445*    (2006.01)

(52) U.S. Cl. ...... 455/418; 455/436; 455/442; 455/552.1; 717/168; 717/171; 717/173; 717/174; 717/177

(58) Field of Classification Search .................. 455/418, 455/436–444, 550.1, 552.1, 553.1; 717/168, 717/171, 173, 174, 177
See application file for complete search history.

(56) References Cited

U.S. PATENT DOCUMENTS

| | | | |
|---|---|---|---|
| 8,050,708 B2 * | 11/2011 | March et al. ............... | 455/552.1 |
| 2002/0137514 A1 * | 9/2002 | Mitsugi et al. ............. | 455/436 |
| 2004/0029575 A1 | 2/2004 | Mehta | |
| 2005/0027789 A1 * | 2/2005 | Luo et al. .................... | 709/200 |
| 2006/0130053 A1 * | 6/2006 | Buljore et al. .............. | 717/173 |
| 2006/0282497 A1 | 12/2006 | Braun et al. | |
| 2007/0117564 A1 * | 5/2007 | Reynolds ..................... | 455/436 |
| 2011/0039503 A1 * | 2/2011 | Hu et al. ....................... | 455/74 |

FOREIGN PATENT DOCUMENTS

| | | |
|---|---|---|
| JP | 11-346186 | 12/1999 |
| KR | 100195006 | 2/1999 |
| KR | 100286008 | 1/2001 |

(Continued)

*Primary Examiner* — Wesley Kim
(74) *Attorney, Agent, or Firm* — Nelson Mullins Riley & Scarborough LLP; EuiHoon Lee, Esq.

(57) ABSTRACT

An application component operating method for an SDR terminal in which a plurality of application components are installed on middleware is provided. The method includes: configuring an essential application component commonly required for wireless access services; when a mode change between wireless access services is required, searching for an optional application component for supporting a desired wireless access service; when it is determined in the optional application component search step that the optional application component does not exist in the SDR terminal, downloading the optional application component; and configuring an application component by the essential application component and the optional application component for supporting the desired wireless access service.

5 Claims, 2 Drawing Sheets

FOREIGN PATENT DOCUMENTS

| | | |
|---|---|---|
| KR | 10-0320302 | 12/2001 |
| KR | 10-0611580 | 8/2006 |
| KR | 10-0774475 | 11/2007 |
| KR | 10-2008-0052179 | 6/2008 |

* cited by examiner

APPLICATION COMPONENT OPERATING METHOD FOR SDR TERMINAL AND SDR TERMINAL

RELATED APPLICATIONS

This application is a 35 U.S.C. §371 national stage filing of PCT Application No. PCT/KR2008/007460 filed on Dec. 17, 2008, which claims priority to, and the benefit of, Korean Patent Application No. 10-2007-0131973 filed on Dec. 17, 2007. The contents of the aforementioned applications are hereby incorporated by reference.

TECHNICAL FIELD

The present invention relates to an application component operating method for an SDR (software defined wireless) terminal and an SDR terminal, and in particular, to an SDR terminal and an application component operating method for an SDR terminal classifying waveform application components into an essential application component and optional application components, thereby accommodating high speed and light weight while still maintaining diversified functions.

This work was supported by the IT R&D program of MIC/IITA [2006-S-012-02, Development of Middleware Platform Technology Based on the SDR Mobile Station].

BACKGROUND ART

As the mobile communication industry develops and the use of wireless data, broadcasting, and Internet services by users increases in frequency, service providers provide various forms of wireless broadcasting and data services in addition to voice services through wireless LAN, GPS, EV/DO, DMD, WiBro, HSDPA, etc. Individual services differ from one another in respects to the provided range, purpose, performance, and cost. Presently, users are provided with services mentioned above anywhere by accessing various wireless modes. That is, users are able to select and use data services by selecting appropriate wireless access modes according to their purposes, for example, mobile communication. As a result of the above, there are increasing demands on multi-mode terminals that are capable of performing various wireless access modes, and subsequently, the value of SDR terminals is correspondingly increasing. In the case in which SDR terminals are used primarily for data services, a multi-mode service is made possible just by changing the software. Therefore, it is easy to use a wireless data service which is selected in accordance to the user's demand under various wireless access environments in one SDR terminal, without requiring any hardware changes.

Existing double-mode or multi-mode terminals have wireless access modems and related programs installed therein. Of those terminals, wireless access modes are switched according to the user's purpose. Therefore, basically, software download is unnecessary. Software download is utilized only for error correction, service addition, new pay service subscription, software upgrade, etc. Users can download changed software, for example, a program through cables in agencies or service centers supplying after-sales service or download the changed software. If pay application services, for example, games are incurred, users can download changed software wirelessly. Download in general terminals is limited to partial and restricted software download services.

However, for SDR terminals, since they are basically designed so that it is possible to download wireless-access-related software, thereby providing wireless access services, component-based wireless-access-related software is provided. Users can download software components to support an appropriate wireless access mode in accordance to the user's purpose to, for example, provide memory, in various methods, for example, through cables or wirelessly, thereby being provided with wireless access services.

Further, if standard middleware is recommended for SDR terminals, a wireless access service protocol is designed in application software components configured in function units. The use of a middleware platform is advantageous in standardizing software. Even though communication protocol implementation software accommodates high speed and light weight, if middleware platform is used for componentizing software, this allows the increase in the complexity of software for additional processes and a relatively low speed. This is generally the obstacle in applying an SDR platform to a communication system pursuing quick data process. SDR terminals are generally designed to be configured in waveform application components supporting a wireless communication protocol using a middleware platform while existing wireless terminals are required to reduce weight and be faster. However, even though SDR terminals are advantageous in that they diversify functions, there are disadvantages, such as drawbacks in terms of a reduction in weight and an increase in speed.

When the SDR terminal according to the related art requires software for a wireless access mode other than wireless access modes provided by wireless-access-related software installed therein, users should download all the waveform application components of software for a new wireless access mode. Even if downloading is completed, it takes long time to reset new components or switch between modes. Further, an appropriate operating method for application components of SDR terminals has not been proposed, which causes inconvenience for users.

DISCLOSURE OF INVENTION

Technical Problem

Accordingly, it is an object of the present invention to provide an application component operating method for an SDR terminal and an SDR terminal which accommodate high speed and light weight while maintaining diversified functions.

Technical Solution

According to an aspect of the present invention, there is provided an application component operating method for an SDR terminal having a plurality of application components installed on middleware. The method includes: configuring an essential application component commonly required for wireless access services; searching for an optional application component for supporting a desired wireless access service when a mode change between wireless access services is required; downloading the optional application component when it is determined in the searching for an optional application component that the optional application component does not exist in the SDR terminal; and configuring an application component by the essential application component and the optional application component for supporting the desired wireless access service.

The method may further include resetting a communication path between the application components.

In resetting the communication path, the communication path may be reset such that the application components communicate with each other using an internal interface.

The application components communicating with each other by using the internal interface may be recognized and operated as one application component by the middleware.

Resetting the communication path may be performed by changing application component structure information.

According to another aspect of the invention, an SDR terminal includes: a plurality of application components installed on middleware and classified into an essential application component that is commonly required for wireless access services and optional application components that are selectively required for every wireless access service; a controller searching for an optional application component for supporting a desired wireless access service when a request for changing the mode of the desired wireless access service is received from a user; and an I/O unit downloading the optional application component when the optional application component does not exist in the SDR terminal. The controller configures an application component by the essential application component and the optional application component for supporting the desired wireless access service.

The controller may reset a communication path between the application components by changing application component structure information.

The controller may reset the communication path such that the application components communicate with each other using an internal interface.

The application components communicating with each other by using the internal interface may be recognized and operated as one application component by the middleware.

Advantageous Effects

According to the present invention, diversified functions of SDR terminals are maintained, processes of updating and changing unnecessary components are reduced, and the amount of time required for mode switching is reduced, resulting in reducing the weight and an increase in speed.

The present invention provides users who frequently use high-speed data services with a component structure and an operating method for implementing a high-speed data system, which utilizes the SDR terminals and can be reconfigured.

BEST MODE FOR CARRYING OUT THE INVENTION

Embodiments of the present invention now will be described more fully hereinafter with reference to the accompanying drawings, in which embodiments of the invention are shown. The invention may, however, be embodied in many different forms and should not be construed as limited to the embodiments set forth herein.

Figure 1:
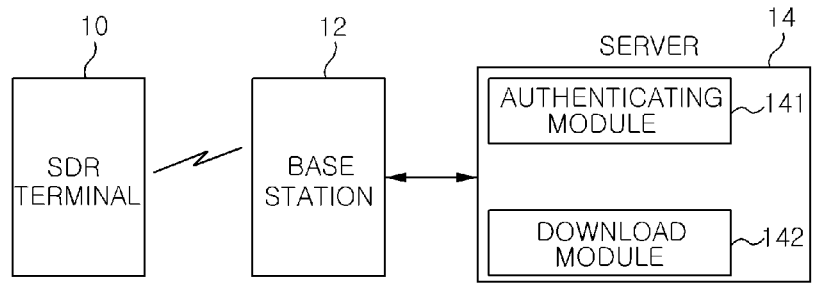
FIG. 1 is a diagram illustrating the entire structure of a data service network including an SDR terminal according to an embodiment of the present invention.

FIG. 1 is a diagram illustrating the entire structure of a data service network including an SDR terminal according to an embodiment of the present invention.

A data service network including an SDR terminal according to an embodiment of the present invention includes an SDR terminal 10, a base station 12, and a server 14. The SDR terminal 10 uses an operating system to wirelessly communicate with the base station 12 through a wireless access manager. The base station 12 provides a wireless access environment and communicates with the server 14 though a cable or wirelessly. The server 14 includes an authenticating module 141 for authenticating the SDR terminal 10 and a download module 142 for providing necessary software components to the SDR terminal 10, and communicates with the SDR terminal 10 through the base station 12.

Figure 2:
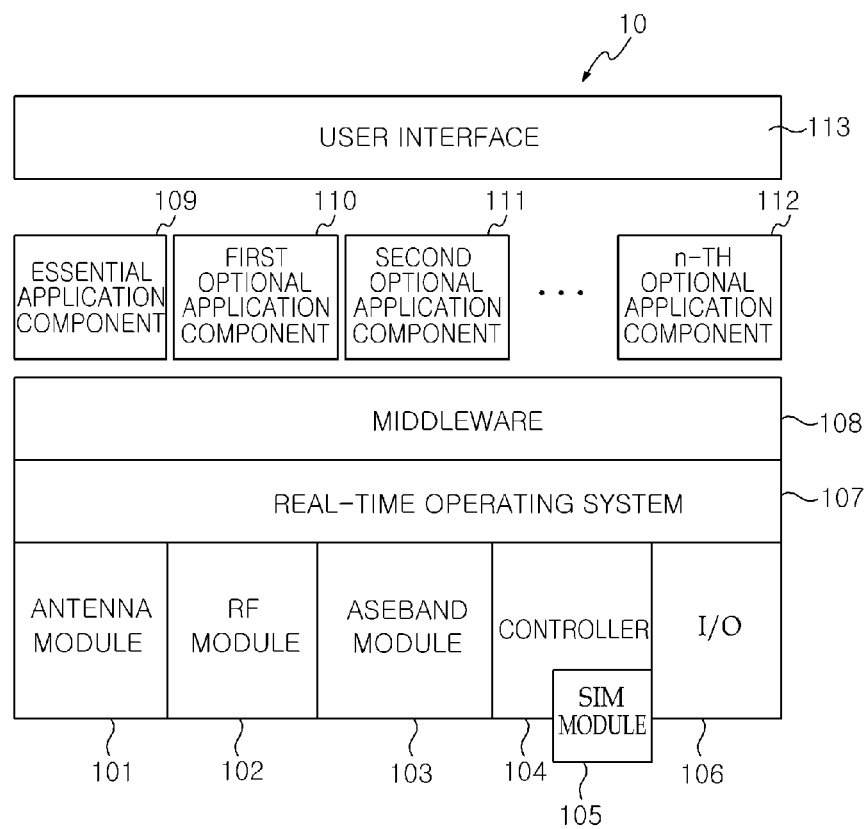
FIG. 2 is a diagram illustrating the entire structure of an SDR terminal including application components according to an embodiment of the present invention.

FIG. 2 is a diagram illustrating the entire structure of an SDR terminal including application components according to an embodiment of the present invention.

The SDR terminal 10 includes an antenna module 101, a RF module 102, a baseband module 103, a controller 104, a SIM module 105, an I/O unit 106, a real-time operating system 107, middleware 108, an essential application component 109, first to n-th optional application components 110, 111, and 112, and a user interface 113. The SDR terminal 10 further includes various necessary components for operation, in addition to the components shown in FIG. 2.

The antenna module 101, the RF module 102, and the baseband module 103 are for wireless access. The controller 104 is a general-purpose processor such as DSP and generally performs control of the SDR terminal 10 and computing. The SIM module 105 is attachable to and detachable from the SDR terminal, is accessible through a standard interface, and stores user information. The I/O unit 106 is for connection with an external device and examples thereof include general-purpose interfaces such as USB and PCMCIA. In a notebook computer or PDA environment, the I/O unit 106 is provided in the form of a wire or wireless LAN and the SDR terminal 10 is provided, through the I/O unit 106, with a wireless map and application components of wireless access software for the initial drive. In case when wireless download is difficult, the I/O unit 106 is utilized for downloading through a cable or another device.

The real-time operating system 107 is a basic operating system installed for operating the SDR terminal 10. The middleware 108 is installed to effectively operate the SDR terminal 10. The essential application component 109 and the first to n-th optional application components 110 to 112 are installed on the middleware. In general, a plurality of essential application components 109 are configured. Those application components for wireless access are installed on the middleware 108 and are driven to provide user-selected wireless access service through the user interface 113.

A feature of the present invention is that waveform application components for providing wireless access are classified into the essential application components 109 and the optional application components 110 to 112, which are installed and operated. For example, a HARQ (hybrid automatic repeat request) function module, an AMC (adaptive modulation and coding) function module, and CQI (channel quality indicator) function module commonly required for high-speed wireless communication are classified into the essential application component 109.

When software components for providing wireless access of the SDR terminal are downloaded, the waveform application components constituting a whole application are divided into function or protocol units. According to the related art, in order to enhance software component reusability, it is required to perform functional componentizing, which makes the structure of an application very complex.

In the embodiments of the present invention, for example, application components commonly utilized in a high-speed wireless communication system are classified as the essential application components 109, whereby mode switch time is reduced and reusability is enhanced. The essential application components 109 reside in the SDR terminal 10 in order to be utilized at any time. When a wireless data service is changed, only the optional application components 110 to 112 are changed depending on structure information so as to reconfigure the SDR terminal 10. Therefore, it is possible to reduce unnecessary update and change of application components, to reduce the amount of software, to reduce mode switch time, and to enhance software reusability. As a result, it is possible to diversify the functions of SDR terminals 10 and to obtain a reduction in weight and an increase in speed.

Figure 3:
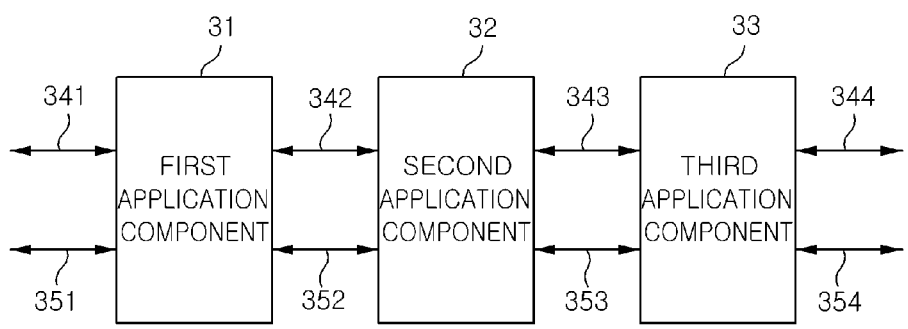
FIG. 3 is a structure diagram illustrating a communication method between application components according to an embodiment of the present invention.

FIG. 3 is a structure diagram illustrating a communication method between application components according to an embodiment of the present invention. As an example, three application components, that is, a first application component 31, a second application component 32, and a third application component 33 are shown in FIG. 3.

As a communication system among the application components 31, 32, and 33 of a SDR terminal according to an embodiment of the present invention, ports 341, 342, 343, and 344 according to a standard and internal interfaces 351, 352, 353, and 354 are provided. Ports 341, 342, 343, and 344 should meet the standards and communicate with middleware and other application components through CORBA communication by a standardized method. The internal interfaces 351, 352, 353, and 354 are a communication system which is provided together with structure information regarding an application component when the application component is designed, enhance reusability, are designed so that high-speed interfacing is possible, and have an internal interface form, for example, IPC. The components communicating with each other by use of the internal interfaces 351, 352, 353, and 354 are cooperated, recognized, and utilized in middleware as one component. After an application is completed by application component download, application components requiring high-speed processes communicate with each other through internal interfaces prepared separately from existing communication ports and are operated as one component, which makes a high-speed data service possible. Standardized ports supplied in the middleware are used to remove delay factors generated on a data path, resulting in better system performance.

Such communication path resetting becomes possible by changing application component structure information. The application component structure information is defined as, for example, the contents of an XML file. The application component structure information may be defined to correspond to the respective application components. Alternatively, the application component structure information on all the application components may be defined in a table format as a file. The application component structure information includes various items, for example, wireless access services, application structure information, application component information, version information, and essential application component flags. The wireless access services represent which wireless access services the application components correspond to. The application structure information represents the structure information of applications providing a corresponding wireless access service and includes a list of necessary application components. The application component information includes information on provided communication paths and parameters, and the version information represents version information of a corresponding application component. The essential application component flag is a flag indicating whether a corresponding application component is an essential application component or an optional application component.

Therefore, in case where the communication path of parameters is defined as port communication in the structure information of an application component, if the communication path is changed to an internal interface, the corresponding application component communicates with another application component using an internal interface, instead of port communication. Consequently, communication between application components using an internal interface becomes possible just by changing the application component structure information and application components is cooperated, recognized, and utilized in middleware as one component, whereby high-speed data services are made possible.

Figure 4:
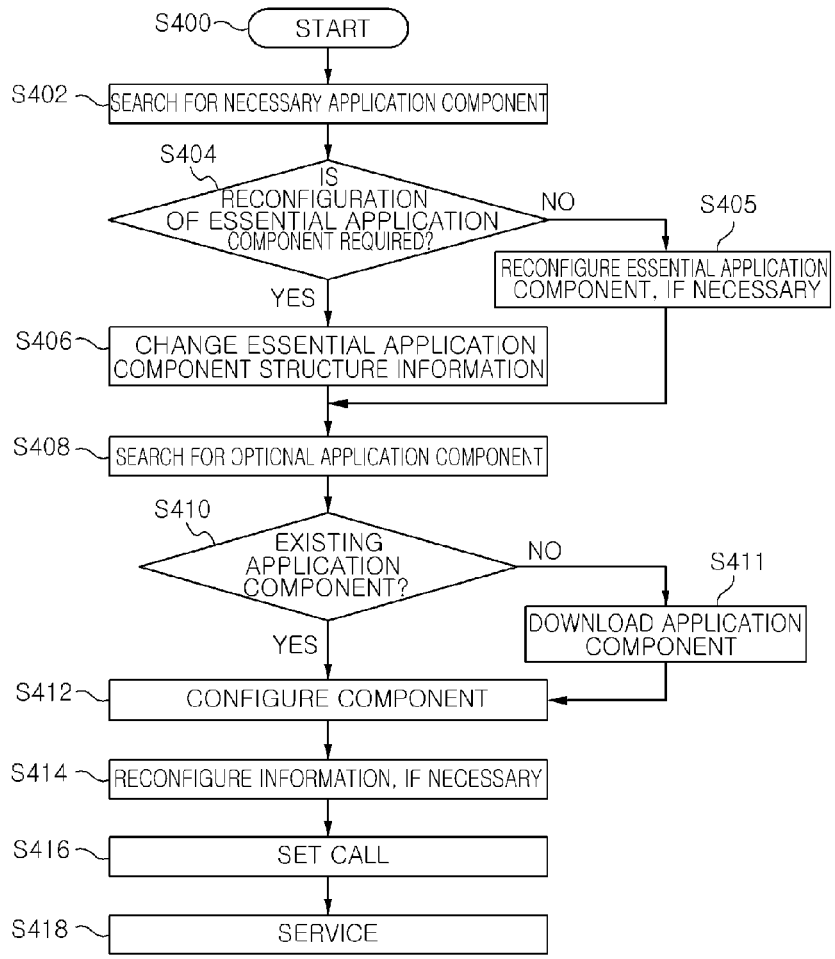
FIG. 4 is a flowchart illustrating an application component operating method according to an embodiment of the present invention.
Figure 5:
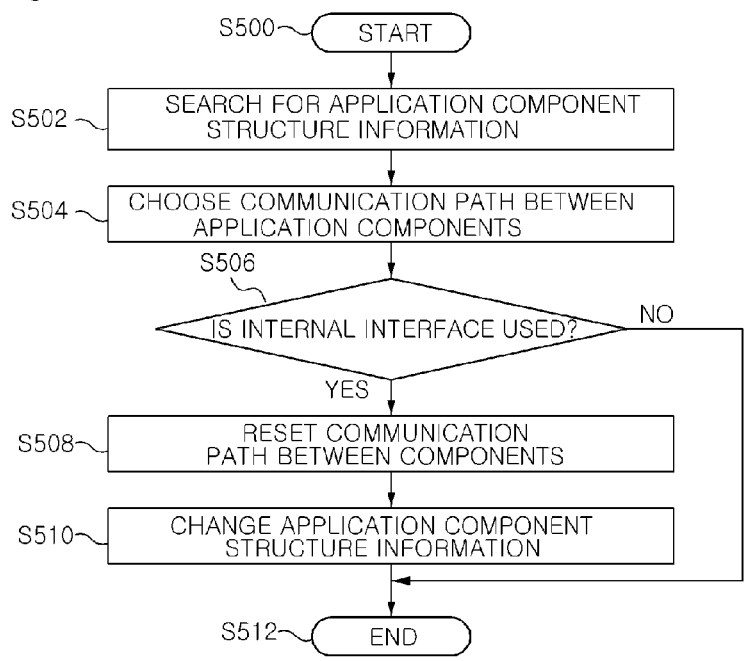
FIG. 5 is a flowchart illustrating a communication path resetting process according to an embodiment of the present invention.

Referring to FIGS. 4 and 5, an application component operating method for an SDR terminal according to an embodiment of the present invention will be described.

FIG. 4 is a flowchart illustrating an application component operating method according to an embodiment of the present invention. An SDR terminal starts its operation (Step S400). If a wireless access service in use exists, the service is utilized by use of an installed wireless access protocol and the process according to the flowchart shown in FIG. 4 is not essential. However, if the user of the SDR terminal wants another wireless access service or the SDR terminal first starts, application components for supporting a wireless access service should be configured.

Middleware installed in the SDR terminal searches for application components required for supporting the corresponding wireless access service (Step S402). Next, the process proceeds to Step S404 to determine whether it is required to reconfigure essential application components installed in the SDR terminal (Step S404). Examples of a case where it is required to reconfigure essential application components include a case where it is required to change a parameter in the structure information of essential application components due to a change in wireless access service to be supported, and a case where it is required to change the structure information of essential application components as a case where essential application component update is required.

If it is determined in Step S404 that it is required to reconfigure essential application components, the process proceeds to Step S406. In Step 406, the structure information of essential application components required for wireless access service change is changed and processes, such as essential application component update, are performed. In principle, the SDR terminal should have essential application components installed therein. However, if an additional essential application component is needed as in case of a new wireless access service requiring a new essential application component, it is possible to download and install necessary essential application components by accessing the server 14 shown in FIG. 1.

If it is determined in Step S404 that it is not required to reconfigure the essential application components, the process proceeds to Step S405 to reconfigure the essential application components, if necessary. In Step 405, a communication path setting between the essential application components is examined, and if necessary, communication path resetting (a port or an internal interface) is performed by changing the structure information. Although Step S405 and Step 406 are separately shown in FIG. 4, they may be unified. In other words, Step S405 and Step 406 may be unified into one step of changing necessary structure information of the essential application components.

Sequentially, the process proceeds to Step 408 to search for optional application components for providing a wireless access service to be supported. A list of optional application components needed to provide a specific wireless access service may be recorded in the structure information of the essential application components, be stored in another storage medium of the SDR terminal, or be downloaded from the server.

In Step S410, it is determined whether the SDR terminal has all the necessary optional application components. If any optional application components does not exist in the SDR terminal (No in Step 410), the process proceeds to Step 411. In Step 411, the corresponding optional application components are downloaded from the server or a mobile storage medium. Next, a component configuring process is performed in Step S412. The component configuring process is a process of changing the structure information so that the essential application components and the optional application components are organically combined to be able to function. Further, processes, such as parameter setting, are performed on the newly downloaded application components in order to make the components configured for the SDR terminal.

Next, the process proceeds to Step S414 to reconfigure information, if necessary. In Step S414, similar to Step S405, a communication path setting between the essential application components and the optional application components is examined, and if necessary, communication path resetting (a port or an internal interface) is performed by changing the structure information. Sequentially, in Step S416, a call establishment procedure is performed and the service starts (Step S418). Then, if necessary, the structure information may be reconfigured so that the essential application components and the optional application components can be organically combined to provide a desired wireless access service.

FIG. 5 is a flowchart illustrating a communication path resetting process according to an embodiment of the present invention. The communication path resetting process is mainly performed in Step S405 (Step S406) and Step S414 of FIG. 4.

In Step S500, the process starts. In Step S502, recorded application component structure information is searched for. Next, in Step S504, a communication system between application components is chosen. The communication system choice may be performed by various criteria. For example, when a plurality of application components communicate with only one another and it is required to improve the performance through high-speed communication, an internal interface communication system may be chosen as the communication system among these application components.

In Step S506, it is determined whether to perform communication using an internal interface. When communication is performed by an internal interface, the communication path between application components is reset in Step S508. In Step S510, the application component structure information is changed. Then, the process ends (Step S512). When a call attempt fails after Step S510, a procedure of resetting the component structure information may be added.

INDUSTRIAL APPLICABILITY

An application component operating method for an SDR terminal and an SDR terminal according to embodiments of the present invention can diversify functions and accommodate high speed and low weight. Therefore, they are expected to contribute to the practical use of SDR terminals.

When an SDR terminal is used to access a current operated wireless data network, the application component operating method according to the invention can be used as a general-purpose SDR terminal operating method by selecting a wireless access service most suitable for user demands and configuring the terminal on the basis of the selected service.

The invention claimed is:

1. An application component operating method for an SDR terminal having a plurality of application components installed on middleware, the method comprising:
   configuring an essential application component commonly required for wireless access services;
   searching for an optional application component for supporting a desired wireless access service when a mode change between wireless access services is required;
   downloading the optional application component when it is determined in the searching for the optional application component that the optional application component does not exist in the SDR terminal;
   configuring an application component by the essential application component and the optional application component for supporting the desired wireless access service; and
   resetting a communication path between the application components, wherein the communication path is reset such that the application components communicate with each other using an internal interface prepared separately from a communication port in the application components for communicating with the middleware and other application components through CORBA communication.

2. The method of claim 1,
   wherein the application components communicating with each other by using the internal interface are recognized and operated as one application component by the middleware.

3. The method of claim 1,
   wherein the resetting the communication path is performed by changing application component structure information.

4. An SDR terminal comprising: a plurality of application components installed on middleware and classified into an essential application component that is commonly required for wireless access services and optional application components that are selectively required for every wireless access service;
   a controller searching for an optional application component for supporting a desired wireless access service when a request for changing the mode of the desired wireless access service is received from a user; and
   an I/O unit downloading the optional application component when the optional application component does not exist in the SDR terminal,
   wherein the controller configures an application component by the essential application component and the optional application component for supporting the desired wireless access service, and resets a communication path between the application components by changing application component structure information such that the application components communicate with each other using an internal interface prepared separately from a communication port in the application components for communicating with the middleware and other application components through CORBA communication.

5. The SDR terminal of claim 4,
wherein the application components communicating with each other by using the internal interface are recognized and operated as one application component by the middleware.

* * * * *